3,395,975
PRECIPITATION OF BERYLLIUM FROM ORES
James K. Grunig, Butte, Mont., William C. Aitkenhead, Pullman, Wash., and William B. Davis, Anaconda, Mont., assignors to The Anaconda Company, New York, N.Y., a corporation of Montana
No Drawing. Filed Oct. 15, 1963, Ser. No. 316,474
11 Claims. (Cl. 23—18)

This invention relates to a process for the extraction and recovery of beryllium in the form of substantially pure beryllium compounds from beryllium-bearing ores. More particularly, this invention relates to a process for the high yield extraction of acid leachable beryllium values from ores in a manner permitting easy separation of those values from other mineral components in the ores.

Several processes for the extraction of beryllium values from ores have been developed, some of which are only suitable for acid-leachable beryllium values. Each such process, whether an acid leach process or any one of the more general prior art processes for beryllium extraction, has the disadvantage of furnishing only low yields of beryllium. Moreover, in these prior art processes, it has been difficult to separate compounds of aluminum, iron, magnesium and calcium from the beryllium compound component. Hence, the final beryllium product is rather impure. We have discovered a method for the high yield production of substantially pure beryllium hydroxide or beryllium oxide in such quantity as to make it an economically attractive process. This process is the subject of the invention described herein and has the advantage of permitting recovery of up to 95% of the beryllium oxide present in the ore.

It is therefore an object of this invention to provide a process for the high yield extraction of beryllium compounds from beryllium-bearing ores.

It is a further object of this invention to provide an economical process for producing beryllium oxide from ores, which process permits the easy separation of the beryllium values from other compounds which heretofore have been very difficult to separate. In one aspect of the invention, acid leaching of the beryllium values is carried out in a manner which achieves the further object and advantage of a substantial savings of mineral acids.

The above objects, and other objects of the invention are accomplished by a process comprising leaching beryllium-bearing ore in moderate concentration of sulfuric acid (e.g. maintaining 0.75% to 1.25% aqueous $H_2SO_4$ solutions), advantageously for a period of about 24 hours at a temperature of from about 160° F. to about 200° F. At the end of the leaching operation the pH preferably is in the pH range 1.5 to 2.0. The acid slurry produced by the leaching step is filtered and the pH of the resulting filtrate is adjusted to a value of from about 3 to 4. The filtrate is then heated in an autoclave, preferably for a period of from about one-half to about one hour, at a temperature of from about 300° F. to about 600° F., preferably from about 350° F. to 500° F., and at a pressure of from about 400 p.s.i. to about 800 p.s.i., preferably from about 500 p.s.i. to 700 p.s.i. After autoclaving, the leach liquor is filtered, producing a first filtrate containing the solubilized beryllium value substantially free of many impurities such as compounds or aluminum, iron, and calcuim. An oxidizing agent may be added to the first filtrate to oxidize such solubilized heavy metal impurities (small amounts of iron, manganese, etc., for example) as accompany the beryllium values, and an alkali is added to raise the pH to a value from about 5 to about 6. The first filtrate is filtered producing a second filtrate wherein the principal cation is beryllium. Alkali is added to the second filtrate in order to raise the pH to a value in the range from about 6 to about 10. This produces a precipitate rich in beryllium hydroxide. The precipitate may then be washed and fired to produce substantially pure beryllium oxide.

The beryllium in Spors Mountain and Topaz ores is thought to be contained in the mineral bertrandite, $Be_4Si_2O_7(OH)_2$ and beryliferrous saponite, a clay-like mineral, which are soluble in moderate concentrations of mineral acid. In contrast to bertrandite, beryl $$(3BeO.Al_2O_3.6SiO_2)$$

and phenacite ($Be_2SiO_4$), other forms of naturally occurring beryllium, are not readily soluble in moderate acid concentrations, but may be rendered acid soluble by prior art processes including fluoride sintering or alkali fusion. Spors Mountain and Topaz ores are thus susceptible to leaching directly by mineral acid and may therefore be advantageously used in the processes of this invention. Other ores containing beryllium values, when rendered mineral acid soluble by prior art methods, may also be used in the processes herein.

Hydrochloric or sulfuric acids may be used for the acid leach, although sulfuric acid is preferred. Spors Mountain or Topaz ore may be leached by conventional methods, but it is preferably leached with from about 250 to 350 pounds of $H_2SO_4$ per ton of ore for a period of about 24 hours at a temperature of from about 160° F. to 200° F. The dilution of the acid leach solution with water should be sufficient to result in a slurry of from about 25% to 33% solids. Portions of the total quantity of sulphuric acid are, in accordance with our preferred technique, added stepwise over the 24 hours leaching period in order to prevent localized high acid concentrations which could result in excessive leaching of impurities. For example, approximately 10 to 15 pounds of acid per ton or ore per hour may with advantage be added to the material undergoing leaching over the leaching period. Conventional methods require less leaching time but call for about 1000 pounds of acid per ton of ore. Hence, the preferred leaching technique of our invention results in a substantial acid savings as well as reduction of impurities leached from the ore. It also results in an indirect savings in that less alkali is required to attain the desired pH in subsequent steps of the process, since the pH of the acid slurry (about 1.5) is not as low as that of the acid slurry produced by a conventional acid leach (about 0.5). The lower concentration of acid in the leach solution has the additional advantage of maximizing beryllium value extraction while minimizing solubilization of other mineral impurities which would be soluble in a solution more concentrated in acid.

The acid slurry produced by leaching is filtered, producing a leach liquor and a cake residue, the latter consisting of silicates and other acid-insoluble compounds. The cake residue is discarded. A suitable alkali, such as sodium hydroxide, ammonium hydroxide, or the like, is then added to the leach liquor in order to adjust its pH to a value generally in the range from about 1.5 to about 4, and in certain preferred operations in the range from about 3 to about 4, advantageously about 3.9. The partially neutralized leach liquor then is fed to an autoclave where it is heated for a period of from about one-half to one hour at a temperature from about 300° F. to about 600° F., and preferably from about 350° F. to 500° F., at the equilibrium pressure of from about 400 to 800 p.s.i., preferably from about 500 to 700 p.s.i. Autoclaving causes the precipitation of fluoride ion when this is present in the acid slurry and also facilitates precipitation of substantially all the iron and most of the aluminum in the leach liquor. Fluoride is precipitated in quantity proportional to the quantity of aluminum ion present and may not be precipitated in toto if sufficient aluminum ion is not present in the slurry. This factor forms the basis for a modification of the process of our invention described below. X-ray diffraction examination has revealed that the autoclave precipitates are largely composed of basic ion sulfate and aluminum hydroxyfluoride when the fluoride ion is present in the leach liquor. In the absence of fluoride anions, the precipitates are composed essentially of basic sulfates of iron and aluminum.

The pH of the autoclave feed solution is important. Below a pH of about 1.5, basic iron sulfates and aluminum hydroxyfluoride fail to precipitate; above a pH of 4, beryllium compounds begin to precipitate. Acid is generated during autoclaving, hence provision should be made for continuous feeding of alkali to insure the most complete precipitation of impurities without appreciably diminishing beryllium recovery. The optimum pH of the fed solution is from about 3 to about 4; but the wider range (1.5 to 4) may be desirable under certain conditions of operation. For example, in a two step autoclave technique, the pH during the first step would be kept low (near 1.5) to reject most of the aluminum cation with negligible loss of beryllium, and during the second step the pH would be kept high (near 4) to achieve maximum purity of beryllium solution, precipitate formed in the second step being recycled for retreatment in the leaching operation.

The optimum pH of the autoclave discharge may range between 1.5 and 4.0 depending on the temperature at which the operation is carried out and the amount and nature of impurities precipitated.

After autoclaving, the leach liquor is filtered and the cake residue is water-washed and discarded. Only a small amount, generally less than 3%, of the total beryllium (as BeO) remains in the cake. Subsequent treatment of the filtrate depends upon the purity of the beryllium hydroxide required, this factor being weighted with factors of economy and time. Thus, a short method may be adopted: a suitable alkali such as NaOH, $NH_4OH$, or the like, is added to the filtrate to adjust the pH thereof to about 7. $Be(OH)_2$ thereupon precipitates out. It is washed and may be fired at about 1600° F. to produce BeO, the recovery from this operation being in a typical case approximately 70% of the assayed BeO in the ore.

Increased purity and increased yields may be obtained by a more sophisticated post-autoclave treatment: (either NaOH or $NH_4OH$) is added to the filtered leach liquor to adjust the pH level to a value between about 5 and about 6. Simultaneously an oxidizing agent, preferably hydrogen peroxide or a persulfate, is added in a quantity stoichiometrically sufficient to oxidize accompanying impurities, especially ferrous iron and manganous manganese. The thus-treated liquor (termed the first filtrate for reference purposes) is then filtered and washed. The second filtrate thereby obtained contains the beryllium values, and the cake residue consists predominately of aluminum hydroxide. Alkali, either NaOH or preferably $NH_4OH$, is added to the second filtrate raising the pH to a value in the range from about 6 to about 10, preferably to about 7.5. Substantially pure $Be(OH)_2$ is then precipitated out. It may be washed, dried and fired at about 1600° F. to produce BeO. The recovery when employing this treatment is typically in excess of 90% of the assayed BeO in the ore.

During the autoclave treatment, hydrolysis of sulfates occurs. In the absence of fluorides, basic sulfates of iron and aluminum form as precipitates. As stated above, in the presence of fluorides, the autoclave precipitates include hydroxyfluoride of aluminum accompanying the usual basic iron sulfates. During the post-autoclave precipitation of aluminum as aluminum hydroxide, a quantity of beryllium hydroxide may be co-precipitated with it. It appears that the presence of fluoride anions in a quantity substantially in excess stoichiometrically of the aluminum ions causes the formation of soluble, complex fluorides: $AlF^{-3}$ or $AlF_5^{-2}$. These cannot be precipitated out of the leach liquor by heating in the autoclave. When carried over into the first filtrate, these complex fluorides interfere with the selective precipitation of impurities from the soluble beryllium sulfate by controlling the pH of the solution (preferably in the range 5.3 to 5.8). More complete precipitation of fluorine during the autoclave step is achieved under these conditions (excessive fluoride concentration) by a modification of the principle process of the invention described above. In this modification an aluminum salt, preferably aluminum sulfate, is added to the autoclave feed solution. The quantity of salt added is stoichiometrically sufficient to form hydroxyfluorides with all the available fluoride anion in the leach liquor. During autoclaving, the fluoride ion is thus substantially completely removed by precipitation and will not interfere with the subsequent $Be(OH)_2$ precipitation. Then, should the process of precipitating the post-autoclave filtrate at a pH of 5 be adopted, the precipitate at that pH will be $Al(OH)_3$ substantially free of any $Be(OH)_2$. By the addition of the aluminum salt before autoclaving, the fluoride ion is removed from the leach liquor as the insoluble hydroxyfluoride, in the filter cake from which the first filtrate is separated.

The processes of this invention may be modified in a manner which is the converse of the modification described in the preceding paragraph. When aluminum ions are present in large amounts and particularly when the stoichiometric ratio of aluminum to fluoride is very great, or when fluorides are not present in the leach liquor containing large amounts of aluminum, the purity of the final $Be(OH)_2$ product may be impaired because aluminum cations are not completely precipitated in the autoclave and subsequent precipitations. To obviate this difficulty, alkali or alkaline earth fluoride is added to the leach liquor prior to autoclaving in an amount stoichiometrically sufficient to form complex hydroxyfluorides with the aluminum in the liquor. With such addition of alkali or alkaline earth fluoride, most of the aluminum will be precipitated.

It is clear that the two preceding modifications are control mechanisms by which the important autoclave precipitation selectively separates the beryllium values from aluminum and iron values, which have heretofore hindered extraction of pure BeO in high yields from ores. If the ore assay reveals beryllium-bearing ore to be deficient in fluorides, then a preferred process of our invention would require the addition of an alkali fluoride prior to autoclaving. If the assay reveals that the ore contains an excess of fluoride ion over the amount theoretically sufficient to produce complex aluminum and iron hydroxyfluoride precipitates during heating in the autoclave, then an aluminum salt is added. In either case, the amount of salt added is based upon the quantitative deficiency of the particular ion (either $F^-$ or $Al^{+3}$), revealed by the ore assay and is equal in amount to that which will stoichiometrically cause that deficiency to be made up with the optimum elimination of aluminum, iron and fluoride.

We claim:

1. The process of extracting beryllium values from acid leachable beryllium-bearing material, the beryllium value content of which is soluble in mineral acid which comprises leaching said material with a mineral acid producing an acidic slurry of said material, filtering said slurry to produce a leach liquor, adding an alkali to said leach liquor to adjust the pH thereof to a value in the range from about 1.5 to about 4, heating said leach liquor in an autoclave at a temperature of from about 300° F. to 600° F. and at a pressure of from about 400 p.s.i. to about 800 p.s.i., filtering the autoclave leach liquor to produce a filtrate, and adding an alkali to said filtrate to bring it to a pH of about 7 thus precipitating values rich in beryllium.

2. The process of extracting beryllium values from acid leachable beryllium-bearing material, the beryllium value content of which is soluble in mineral acid, which comprises leaching said material with an acid selected from the group consisting of sulfuric acid and hydrochloric acid, thereby producing an acid slurry of said material, filtering said slurry producing a leach liquor, adding an alkali to said leach liquor to adjust the pH thereof to a value in the range from about 1.5 to about 4, heating said leach liquor in an autoclave for a period of from about one-half to about one hour at a temperature of from about 350° F. to 500° F. and at a pressure of from about 400 p.s.i. to about 800 p.s.i., filtering the autoclaved leach liquor to produce a first filtrate, adding an oxidizing agent to said first filtrate and also adding an alkali thereto to adjust the pH thereof to a value from about 5 to about 6, filtering said first filtrate to remove precipitated products thus yielding a second filtrate, and adding an alkali to said second filtrate to increase the pH thereof to a value in the range from about 6 to about 10 producing a precipitate rich in beryllium values.

3. The process of extracting beryllium value from acid leachable beryllium-bearing ore, the beryllium value content of which is soluble in mineral acid, which comprises leaching said ore over a period of about 24 hours with from 250 to 350 pounds of $H_2SO_4$ per ten of ore at a temperature of from about 160° F. to about 200° F. thus producing an acidic slurry of said ore, filtering said slurry to produce a leach liquor, adding an alkali to said leach liquor to adjust the pH thereof to a value of from about 1.5 to 4, heating said leach liquor in an autoclave at a temperature of from about 350° F. to 500° F. and at a pressure of from about 500 p.s.i. to about 700 p.s.i., filtering the autoclaved leach liquor to produce a filtrate, and adding an alkali to said filtrate to bring said filtrate to a pH of about 7 thus precipitating values rich in beryllium.

4. The process of extracting beryllium values from acid leachable beryllium-bearing ore, the varyllium value content of which is soluble in mineral acid which comprises leaching said ore over a period of about 24 hours with from 250 to 350 pound $H_2SO_4$ per ton of ore, added stepwise over the leaching period at a temperature of from about 160° F. to about 200° F., thus producing an acidic slurry of said ore, filtering said slurry to produce a leach liquor, adding an alkali to said leach liquor to adjust the pH thereof to a value between about 3 and about 4, heating said leach liquor in an autoclave for a period of from about one-half to about one hour at a temperature from about 350° F. to about 500° F. and at a pressure of from about 500 p.s.i. to about 700 p.s.i., filtering the autoclaved leach liquor to produce a first filtrate, adding an oxidizing agent to said first filtrate and adding an alkali thereto to adjust the pH thereof to a value between about 5 and about 6, filtering said first filtrate to remove precipitated products thus yielding a second filtrate, and adding an alkali to said second filtrate to a pH in the range from about 6 to about 10 producing a precipitate rich in beryllium values.

5. The process of extracting beryllium values from acid leachable beryllium-bearing material containing fluoride wherein the beryllium value content of said material is soluble in mineral acid, which comprises leaching said material with a mineral acid producing an acid slurry, filtering said slurry to produce a leach liquor, adding an alkali to said leach liquor to adjust the pH thereof to a value in the range from about 1.5 to about 4, adding an aluminum salt to said leach liquor in a quantity stoichiometrically sufficient to form complex aluminum hydroxyfluoride with the fluoride present in said leach liquor, heating said leach liquor in an autoclave at a temperature between about 350° F. and about 500° F. and at a pressure from about 500 p.s.i. to about 700 p.s.i., filtering the autoclaved leach liquor to produce a filtrate, and adding an alkali to said filtrate to bring said filtrate to a pH of about 7 thus precipitating values rich in beryllium.

6. The process of extracting beryllium values from acid leachable beryllium-bearing material containing fluorides wherein the beryllium value content of said material is soluble in mineral acid, which comprises leaching said material with a mineral acid producing an acid slurry, filtering said slurry to produce a leach liquor, adding an alkali to said leach liquor to adjust the pH thereof to a value in the range from about 1.5 to about 4, adding aluminum sulfate to said leach liquor in a quantity stoichiometrically sufficient to form complex aluminum hydroxyfluoride with the fluoride present in said leach liquor, heating said leach liquor in an autoclave for a period of from about one-half to about one hour at a temperature of from about 350° F. to 500° F. and at a pressure of from about 500 to about 700 p.s.i., filtering the autoclaved leach liquor to produce a first filtrate, adding an oxidizing agent to said first filtrate and also adding an alkali thereto to adjust the pH thereof to a value between about 5 and about 6, filtering said first filtrate to remove precipitated products thus yielding a second filtrate, and adding an alkali to said second filtrate to a pH in the range from about 6 to about 10 producing a precipitate rich in beryllium values.

7. The process of extracting beryllium values from acid leachable beryllium-bearing ore containing fluorides wherein the beryllium value content of said ore is soluble in mineral acid, which comprises leaching said ore over a period of about 24 hours with from 250 to 350 pounds of $H_2SO_4$ per ton of ore at a temperature from about 160° F. to about 200° F. thus producing an acid slurry of said ore, said sulfuric acid being added stepwise at the rate of about 10 to 15 pounds per ton of ore per hour over the leaching period, filtering said slurry to produce a leach liquor, adding aluminum sulfate to said leach liquor in a quantity stoichiometrically sufficient to form complex aluminum hydroxyfluoride with the fluoride present in said leach liquor, adding an alkali to said leach liquor to adjust the pH thereof to a value from about 3 to about 4, heating said leach liquor in an autoclave for a period of from about one-half to about one hour at a temperature of from about 350° F. to 500° F. and at a pressure of from about 500 to about 700 p.s.i., filtering the autoclaved leach liquor to produce a first filtrate, adding an oxidizing agent to said first filtrate and adding an alkali thereto to adjust the pH thereof to a value from about 5 to about 6, filtering said first filtrate to remove precipitated products thus yielding a second filtrate, and adding an alkali to said second filtrate to a pH from about 6 to about 10 producing a precipitate rich in beryllium values.

8. The process of extracting beryllium values from acid leachable beryllium-containing ore which additionally contains aluminum and fluoride compounds wherein the beryllium value content of said ore is soluble in mineral acid which comprises leaching said ore producing an acid slurry, filtering said slurry to produce a leach liquor, adding to said leach liquor a quantity of a fluoride selected from the group consisting of alkali and alkaline earth fluorides to the extent that said leach liquor is deficient in fluoride to complex with aluminum ion therein to form complex aluminum hydroxyfluoride, adding an alkali to said leach liquor to adjust the pH thereof to a value between about 1.5 and about 4, heating said leach liquor in an autoclave at a temperature from about 350° F. to about 500° F. and at a pressure of from about 500 p.s.i. to about 700 p.s.i., filtering the autoclaved leach liquor to produce a filtrate, and adding an alkali to said filtrate to bring said filtrate to a pH of about 7 thus precipitating values rich in beryllium.

9. The process of extracting beryllium values from acid leachable beryllium-containing ore which additionally contains aluminum and fluoride compounds wherein the beryllium value content of said ore is soluble in mineral acid, which comprises leaching said ore over a period of about 24 hours with 250 to 350 pounds H₂SO₄ per ton of ore added stepwise over the leaching period at a temperature between about 160° F. and about 200° F. thus producing an acid slurry of said ore, filtering said slurry to produce a leach liquor, adding to said leach liquor a quantity of a fluoride selected from the group consisting of alkali and alkaline earth fluorides to the extent that said leach liquor is deficient in fluoride to complex with aluminum ion therein to form complex aluminum hydroxyfluoride, adding an alkali to said leach liquor to adjust the pH thereof to a value in the range from about 1.5 to about 4, heating said leach liquor in an autoclave for a period of from about one-half to one hour at a temperature of from about 350° F. to 500° F. and at a pressure of from about 500 p.s.i. to about 700 p.s.i., filtering said leach liquor to produce a filtrate, and adding an alkali to said filtrate to bring said filtrate to a pH in the range from about 6 to about 10 thus precipitating values rich in beryllium.

10. The process of extracting beryllium values from acid leachable beryllium-containing ore which additionally contains aluminum compounds wherein the beryllium value content of said ore is soluble in mineral acid, which comprises leaching said ore with a mineral acid producing an acid slurry, filtering said slurry to produce a leach liquor, adding to said leach liquor a quantity of a fluoride selected from the group consisting of alkali and alkaline earth fluorides, said added fluoride being stoichiometrically sufficient to combine with the available aluminum ions present in said leach liquor as insoluble complex aluminum hydroxyfluoride, adding an alklali to said leach liquor to adjust the pH thereof to a value between about 3 and about 4, heating said leach liquor in an autoclave at a temperature between about 350° F. and about 500° F. and at a pressure of from about 500 p.s.i. to about 700 p.s.i., filtering the autoclaved leach liquor to produce a filtrate, and adding an alkali to said filtrate to a pH of about 7 thus precipitating values rich in beryllium.

11. The process of extracting beryllium values from acid leachable beryllium-bearing material, the beryllium value content of which is soluble in mineral acid, which comprises leaching said material with sulfuric acid producing an acidic slurry of said material, filtering said slurry to produce a leach liquor, adding an alkali to said leach liquor to adjust the pH thereof to a value near 1.5, heating said leach liquor in a first autoclaving step at a temperature between about 300° C. and about 600° C. and at equilibrium pressure, filtering the solution from said first autoclaving step to reject the bulk of the impurities in the undissolved residue, adding an alkali to the filtered solution to adjust the pH thereof to a value near 4, heating such solution in a second autoclaving step at a temperature between about 300° C. and about 600° C. and at equilibrium pressure, filtering the solution from said second autoclaving step to form a highly purified solution, and a filter cake comprising impurities and recoverable beryllium, recycling said filter cake to the leaching operation, and adding alkali to the purified solution to bring the pH thereof to a value in the range from about 6 to about 10 thus precipitating values rich in beryllium.

References Cited

UNITED STATES PATENTS

| 2,148,520 | 2/1939 | Windecker | 23—24.2 |
| 2,298,800 | 10/1942 | McKee | 23—183 X |
| 3,059,998 | 10/1962 | Mod et al. | 23—183 |
| 3,116,110 | 12/1963 | Morana et al. | 23—183 |
| 3,145,081 | 8/1964 | Surls et al. | 23—183 |
| 3,177,068 | 4/1965 | Mod et al. | 75—101 |

OSCAR R. VERTIZ, *Primary Examiner.*

HERBERT T. CARTER, *Assistant Examiner.*